US009718961B2

(12) United States Patent
Corveleyn et al.

(10) Patent No.: US 9,718,961 B2
(45) Date of Patent: Aug. 1, 2017

(54) FLUOROPOLYETHER-POLYSILOXANE ELASTOMER COMPOSITIONS AND SHAPED ARTICLES

(71) Applicant: 3M INNOVATIVE PROPERTIES COMPANY, St. Paul, MN (US)

(72) Inventors: Steven G. Corveleyn, Knokke-Heist (BE); Rudolf J. Dams, Antwerp (BE); Tom Opstal, Laarne (BE); Miguel A. Guerra, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/900,614

(22) PCT Filed: Jun. 13, 2014

(86) PCT No.: PCT/US2014/042282
§ 371 (c)(1),
(2) Date: Dec. 21, 2015

(87) PCT Pub. No.: WO2014/209635
PCT Pub. Date: Dec. 31, 2014

(65) Prior Publication Data
US 2016/0145433 A1 May 26, 2016

Related U.S. Application Data

(60) Provisional application No. 61/840,076, filed on Jun. 27, 2013.

(51) Int. Cl.
| | | |
|---|---|---|
| *C08L 71/00* | (2006.01) | |
| *C08L 83/08* | (2006.01) | |
| *C08G 65/00* | (2006.01) | |
| *C08G 65/332* | (2006.01) | |
| *C08G 65/337* | (2006.01) | |
| *C08G 77/385* | (2006.01) | |
| *C08G 77/46* | (2006.01) | |
| *C08G 65/22* | (2006.01) | |
| *C08G 77/20* | (2006.01) | |
| *C08G 77/24* | (2006.01) | |

(52) U.S. Cl.
CPC ............ *C08L 83/08* (2013.01); *C08G 65/007* (2013.01); *C08G 65/332* (2013.01); *C08G 65/337* (2013.01); *C08L 71/00* (2013.01); C08G 65/226 (2013.01); C08G 77/20 (2013.01); C08G 77/24 (2013.01); C08G 77/385 (2013.01); C08G 77/46 (2013.01); C08G 2650/48 (2013.01); C08L 2205/05 (2013.01)

(58) Field of Classification Search
CPC ....... C08L 71/00; C08L 83/08; C08G 65/226; C08G 77/385; C08G 77/46
See application file for complete search history.

(56) References Cited

U.S. PATENT DOCUMENTS

| | | | |
|---|---|---|---|
| 3,125,599 | A | 3/1964 | Warnell |
| 3,250,807 | A | 5/1966 | Fritz |
| 3,250,808 | A | 5/1966 | Moore |
| 3,392,097 | A | 7/1968 | Gozzo |
| 3,644,300 | A | 2/1972 | Dorfman |
| 3,646,085 | A | 2/1972 | Bartlett |
| 3,699,145 | A | 10/1972 | Sianesi |
| 3,810,874 | A | 5/1974 | Mitsch |
| 4,314,043 | A | 2/1982 | Kojima |
| 4,488,771 | A | 12/1984 | Koford |
| 4,600,651 | A | 7/1986 | Aufdermarsh |
| 4,647,413 | A | 3/1987 | Savu |
| 5,288,376 | A | 2/1994 | Oyama |
| 5,453,549 | A | 9/1995 | Koike |
| 5,545,693 | A | 8/1996 | Hung |
| 5,681,921 | A * | 10/1997 | Iwa ...................... C07D 251/24 528/362 |
| 5,688,872 | A | 11/1997 | Sonoi |
| 5,700,879 | A | 12/1997 | Yamamoto |
| 5,834,564 | A * | 11/1998 | Nguyen ............ C08F 216/1416 525/326.3 |
| 6,114,452 | A | 9/2000 | Schmiegel |
| 6,465,576 | B1 | 10/2002 | Grootaert |
| 6,552,152 | B2 | 4/2003 | Sakano |
| 6,638,999 | B2 | 10/2003 | Bish |

(Continued)

FOREIGN PATENT DOCUMENTS

| | | | |
|---|---|---|---|
| CN | 102827470 A | 12/2012 | |
| EP | 0171061 | 2/1986 | |
| EP | 0514270 A1 * | 11/1992 | ............ C07F 7/0836 |
| EP | 1353998 | 10/2003 | |
| EP | 1509570 | 3/2005 | |
| EP | 1995277 | 11/2008 | |
| WO | WO 2005-059028 | 6/2005 | |
| WO | WO 2012-121898 | 9/2012 | |
| WO | WO 2012-138457 | 10/2012 | |
| WO | WO 2014-055406 | 4/2014 | |
| WO | WO 2015-126949 | 8/2015 | |

OTHER PUBLICATIONS

Wlassics, "Synthesis of α, ωperfluoropolyether iodides", Journal of Fluorine Chemistry, 2005, vol. 126, No. 1, pp. 45-51.

(Continued)

*Primary Examiner* — Richard A Huhn
(74) *Attorney, Agent, or Firm* — Bradford B. Wright

(57) ABSTRACT

A curable composition includes a functionalized fluoropolyether comprising at least one first free-radically reactive functional group, a functionalized polysiloxane comprising at least one second free-radically reactive functional group, and an effective amount of a free-radical curing system. The curable composition can be cured to making a fluoropolyether-polysiloxane elastomer. Compositions and shaped articles including the fluoropolyether-polysiloxane elastomer are also disclosed.

14 Claims, No Drawings

(56) References Cited

U.S. PATENT DOCUMENTS

| | | |
|---|---|---|
| 6,716,534 B2 | 4/2004 | Moore |
| 6,759,468 B2 | 7/2004 | Sato |
| 6,815,492 B2 | 11/2004 | Sato |
| 6,943,216 B2 | 9/2005 | Fukuda |
| 6,956,085 B2 | 10/2005 | Grootaert |
| 7,208,553 B2 | 4/2007 | Grootaert |
| 7,247,749 B2 | 7/2007 | Aufdermarsh |
| 9,023,977 B2 | 5/2015 | Corveleyn |
| 2002/0028902 A1 | 3/2002 | Osawa |
| 2002/0103304 A1 | 8/2002 | Hintzer |
| 2002/0137842 A1 | 9/2002 | Sato |
| 2003/0003236 A1 | 1/2003 | Pickering |
| 2003/0225200 A1 | 12/2003 | Sato |
| 2004/0229992 A1 | 11/2004 | Sato |
| 2006/0041064 A1 | 2/2006 | Gornowicz |
| 2006/0100343 A1 | 5/2006 | Osawa |
| 2006/0270791 A1 | 11/2006 | Kishita |
| 2007/0069187 A1 | 3/2007 | Tonge |
| 2012/0009438 A1 | 1/2012 | Dams |
| 2012/0220719 A1 | 8/2012 | Corveleyn |

OTHER PUBLICATIONS

International Search report for PCT International Application No. PCT/US2014/042282 mailed on Nov. 6, 2014, 4 pages.

* cited by examiner

FLUOROPOLYETHER-POLYSILOXANE ELASTOMER COMPOSITIONS AND SHAPED ARTICLES

TECHNICAL FIELD

The present disclosure broadly relates to fluoropolyether-polysiloxane elastomers, curable precursor compositions for making them, and compositions and shaped articles containing them.

BACKGROUND

Fluorosilicone elastomer rubber is used in many automotive and industrial applications because of their resistance to extreme environmental and service conditions. These elastomers retain their elastomeric properties over a broad temperature range. For example, in some applications these materials can be exposed to temperatures below −40° C., or even below −100° C., for an extended period of time. In other applications, they can be used in environments having a temperature of 200° C. or even higher. In addition, fluorosilicone elastomers generally have excellent resistance to fuels and oils, making them useful for sealing applications in aerospace, automotive, and chemical processing industries.

One drawback of fluorosilicone elastomers has been their limited resistance to polar solvents, hydrocarbon fluids, and brake fluids containing phosphate esters.

U.S. Pat. No. 6,815,492 B2 (Sato et al.) discloses a curable fluoropolyether rubber composition containing: (A) a linear fluoropolyether compound having at least two alkenyl organic groups per molecule and a backbone with a perfluoropolyether structure; (B) an organosilicon compound having at least two silicon-bonded hydrogen atoms (SiH organic groups) per molecule; (C) a hydrosilylation catalyst; and (D) a silica filler. The rubber compositions are said to have good resistance to: fuels, jet engine oils, amines, and oils, gas permeability, water, heat, and cold. Curing was accomplished by hydrosilylation using a hydrosilylation catalyst. Hydrosilylation catalysts are generally expensive. Furthermore, as the catalyst is not incorporated in the polymer, these metal compounds may tend to leach out of the rubber composition and cause contamination issues.

There remains a need for new methods and materials for making fluorosilicone elastomers.

SUMMARY

In one aspect, the present disclosure provides a curable composition comprising:
a functionalized fluoropolyether comprising:
a polymer backbone comprising at least one divalent monomeric unit selected from the group consisting of —$C_4F_8O$—, —$C_3F_6O$—, —$C_2F_4O$—, —$CF_2O$—, and combinations thereof;
at least one first free-radically reactive functional group bonded at a terminal position or at a position that is adjacent to the terminal position of the polymer backbone, wherein said at least one first free-radically reactive functional group is selected from the group consisting of: —I; —Br; —Cl; —CN; monovalent organic groups containing at least one —I, —Br, —Cl, —CN; and monovalent free-radically polymerizable ethylenically-unsaturated organic groups;
a functionalized polysiloxane comprising at least one second free-radically reactive functional group selected from the group consisting of: —I; —Br; —Cl; —CN; monovalent organic groups containing at least one —I, —Br, —Cl, —CN; and monovalent free-radically polymerizable ethylenically-unsaturated organic groups; and
an effective amount of a free-radical curing system.

In another aspect, the present disclosure provides a method of making a composition comprising a fluoropolyether-polysiloxane elastomer, the method comprising:
providing a curable composition according to the present disclosure; and
free-radically curing the curable composition.

In yet another aspect, the present disclosure provides a shaped article obtained by injection or compression molding the curable composition according to the present disclosure.

In yet another aspect, the present disclosure provides a fluoropolyether-polysiloxane elastomer having a polymer backbone comprising:
fluoropolyether segments having a number average molecular weight of 400 to 15,000 grams per mole, wherein the fluoropolyether segments comprise at least one divalent monomeric unit selected from the group consisting of —$C_4F_8O$—, —$C_3F_6O$—, —$C_2F_4O$—, —$CF_2O$—, and combinations thereof; and
polysiloxane segments having a molecular weight (e.g., $M_n$ and/or $M_w$) of from 500 to 500,000 grams per mole, wherein the polysiloxane segments are covalently bonded to the backbone fluoropolyether segments.

As used herein, the term "free-radically reactive" means that the group reacts with a free-radical to generate a carbon-based radical.

Features and advantages of the present disclosure will be further understood upon consideration of the detailed description as well as the appended claims.

DETAILED DESCRIPTION

Fluoropolyether-polysiloxane elastomers according to the present disclosure have low glass transition temperatures, and have sufficient mechanical strength to be used in the preparation of shaped articles. Due to the low glass transition temperatures of polyether-polysiloxane elastomers, shaped articles including them may remain flexible at low temperatures. In some embodiments, fluoropolyether-polysiloxane elastomers according to the present disclosure may have a first glass transition temperature of less than −50° C. and a second glass transition temperature of less than −100° C.

Fluoropolyether-polysiloxane elastomers according to the present disclosure typically have high chemical resistance, particularly to ketone solvents. For example, in some embodiments, shaped articles made from the fluoropolyether-polysiloxane elastomers may have a volume swell in acetone of less than 100 percent, preferably less than 75 percent, and more preferably less than 50 percent.

The fluoropolyether-polysiloxane elastomers can be prepared by free-radically curing one or more fluoropolyethers in the presence of one or more polysiloxanes by a free-radical curing reaction, as described herein.

The functionalized fluoropolyether(s) and functionalized polysiloxane(s) (which are both typically liquids, but this is not a requirement) have functional groups that are reactive in a free-radical curing reaction to cause reaction between the functionalized fluoropolyethers and the functionalized polysiloxanes, thus providing a cured elastomer. In a free-radical curing reaction, free-radicals are generated by one or more free-radical-generating compounds such as, for example, a thermal initiator, a redox initiator, and/or a photoinitiator. The free-radicals are typically generated under the influence of heat or radiation, such as actinic radiation, or as the result of a redox reaction.

Because curing of curable compositions according to the present disclosure generally does not involve a hydrosilation (sometimes termed hydrosilylation) reaction resulting in addition of Si—H bonds to unsaturated bonds, curing can be done in the absence of the transition metals or transition metal compounds, which are typically used as hydrosilation catalyst.

The cured fluoropolyether-polysiloxane elastomers contain fluoropolyether segments that are linked with polysiloxane segments as a result of the radical curing reaction. These components and methods will now be described in greater detail.

Suitable functionalized fluoropolyethers include compounds containing perfluoroalkylenoxy groups (i.e., monomeric units) selected from —$C_4F_8O$— (linear or branched), —$C_3F_6O$— (linear or branched), —$C_2F_4O$—, —$CF_2O$—, and combinations thereof. Typically, these monomeric units are arranged randomly along the fluoropolyether backbone; however, they may be arranged in blocks, if desired. Suitable functionalized fluoropolyethers can have a linear backbone or they can be branched, in which case the backbone may have side chains attached. Side chains may be present, for example, if the functionalized fluoropolyethers contains branched —$C_3F_6O$— or —$C_4F_8O$— units. Examples of —$C_3F_6O$— units include —$CF_2CF_2CF_2O$— and —$CF_2CF(CF_3)O$—. Examples of —$C_4F_8O$— units include —$CF_2CF_2CF_2CF_2O$—, —$CF_2CF_2CF(CF_3)O$, —$CF_2CF(CF_2CF_3)O$—, and —$CF_2C(CF_3)_2O$—.

Suitable functionalized fluoropolyethers include one or more free-radically reactive functional groups that is/are reactive with a free-radical curing system, forming bonds (i.e., crosslinks) between functionalized fluoropolyether molecules and/or between functionalized fluoropolyether molecules and functionalized polysiloxane molecules. Examples of free-radically reactive functional groups include: (i) halo groups selected from iodo groups (—I), bromo groups (—Br), chloro groups (—Cl), and combinations thereof, with one or more iodo groups being preferred; and (ii) monovalent organic groups containing one or more —I, —Br, —Cl, —CN, and (iii) monovalent free-radically polymerizable ethylenically-unsaturated organic groups (preferably containing from 1 to 10 carbon atoms).

Examples of monovalent organic groups containing one or more halo groups include haloalkyl groups having 1 to 4, 6, 8, or 10 carbon atoms, which haloalkyl groups may be non-fluorinated or fluorinated or perfluorinated and may contain multiple halo groups selected from —I, —Br, and/or —Cl. Useful monovalent organic groups also include groups in which one or more, preferably catenary, carbon atoms of a haloalkyl group is substituted by oxygen or nitrogen.

Examples of monovalent organic groups containing one or more cyano groups include cyanoalkyl groups having 1 to 4, 6, 8, or 10 carbon atoms, which cyanoalkyl groups may be non-fluorinated or fluorinated or perfluorinated and may contain multiple cyano groups. Useful monovalent organic groups also include groups in which one or more, preferably catenary, carbon atoms of a cyanoalkyl group is substituted by oxygen or nitrogen.

Examples of monovalent free-radically polymerizable ethylenically-unsaturated organic groups include groups represented by the formula —Z—CW=CW$_2$, wherein each W independently represents H, Cl, F, or CF$_3$; and Z represents a covalent bond or an alkyl or substituted alkyl group containing from 1 to 10 carbon atoms (e.g., —$CH_2CH_2$—, —$CH_2CH(CH_3)$—, and —$(CH_2)_{4-10}$—), optionally containing fluorine, chlorine, oxygen, nitrogen, or sulfur atoms, or a combination thereof, such as for example —$CH_2O$—, —$CH_2OC(=O)$—, —$CH_2OC(=O)NH$—, —$CH_2CH_2OC(=O)$—, perfluoroalkylene (e.g., —$CF_2$—), with the proviso that at least one W, preferably two groups W represent H.

Examples of free-radically polymerizable ethylenically-unsaturated groups include —CH=CH$_2$ (i.e., vinyl), —OCH=CH$_2$ (i.e., vinyloxy), —C(=O)OCH=CH$_2$), —C(=O)NHCH=CH$_2$, —CH$_2$C(=O)CH=CH$_2$, —CH$_2$CH=CH$_2$ (i.e., allyl), —OCH$_2$CH=CH$_2$, —C(=O)OCH$_2$CH=CH$_2$, —OC(=O)CH=CH$_2$ (i.e., acryloxy), —OC(=O)C(CH$_3$)=CH$_2$ (i.e., methacryloxy), —NHC(=O)CH=CH$_2$ (i.e., acrylamido), and —OC)=O)C(CH$_3$)=CH$_2$ (i.e., methacrylamido). The functionalized fluoropolyether may also contain a combination of different functional groups, for example, as described above. In a preferred embodiment, the functional groups are of the same type (e.g., the functional groups all contain —I, —Br, —Cl, —CN, or free-radically polymerizable ethylenically-unsaturated groups).

At least one functional group (preferably the majority of or all functional groups) is positioned at a terminal position of the functionalized fluoropolyether, or at a position adjacent to the terminal position. The term "terminal position" as used herein includes the terminal position of the fluoropolyether backbone, but may further include a terminal position of a side chain in the case of a non-linear fluoropolyether. Preferably, the functionalized fluoropolyether contains two or more (e.g., three or four) functional groups that are reactive to the free-radical curing system.

In some preferred embodiments, the functionalized fluoropolyethers are perfluorinated. As used herein, the terms "perfluoro" and "perfluorinated" refers to an organic group or an organic compound wherein all hydrogen atoms bound to carbon have been replaced by fluorine atoms. A perfluorinated group or compound may, however, contain atoms other than fluorine and carbon atoms such as, for example, N, O, Cl, Br, and I. For example, F$_3$C— and F$_3$CO— correspond to perfluoromethyl and perfluoromethoxy, respectively.

Likewise, as used herein, the term "partially fluorinated" refers to an organic group or an organic compound wherein some but not all hydrogen atoms bound to carbon have been replaced by fluorine atoms. For example, F$_2$HC— and F$_2$HCO— correspond to partially fluorinated methyl and methoxy groups, respectively.

In some preferred embodiments, the functionalized fluoropolyethers consist essentially of monomeric units selected from —$CF_2O$—, —$C_2F_4O$—, —$C_3F_6O$—, —$C_4F_8O$—, and combinations of one or more —$CF_2O$—, —$C_4F_8O$—, —$C_3F_6O$—, and —$C_2F_4O$— units. The term "consisting essentially of" used in reference to a polymer containing specified monomeric units, means the polymer contains at least 80 mole percent, preferably at least 90 mole percent, and more preferably at least 95 mole percent of the specified monomeric units.

Exemplary useful functionalized fluoropolyethers include those represented by the general Formula

X-E-Y wherein X and Y independently represent functional groups that are reactive to the free-radical curing system, and E denotes a divalent fluoropolyether segment, comprising, consisting essentially of, or consisting of perfluoroalkylenoxy groups selected from —C$_4$F$_8$O—, —C$_3$F$_6$O—, —C$_2$F$_4$O— —CF$_2$O— and combinations thereof.

In some embodiments, useful functionalized fluoropolyethers are represented by the general Formula

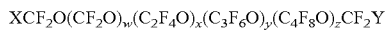
XCF$_2$O(CF$_2$O)$_w$(C$_2$F$_4$O)$_x$(C$_3$F$_6$O)$_y$(C$_4$F$_8$O)$_z$CF$_2$Y wherein X and Y independently represent a functional group that is reactive to a free-radical curing system, and w, x, y and z are independently integers of from 0 to 30, with the proviso that w+x+y+z≥6, and wherein the perfluoroalkylenoxy monomeric units may be placed randomly or in blocks.

X and Y independently represent a free-radically polymerizable ethylenically-unsaturated group —Z—CW=CW$_2$ wherein: each W independently represents H, Cl, F or CF$_3$, with the proviso that at least one W is H; and Z represents a covalent bond or an alkylene group having from of 1 to 10 carbon atoms, optionally substituted by at least one of fluorine, chlorine, oxygen, nitrogen, or sulfur (e.g., —CH$_2$O—, —CH$_2$CH$_2$—, —(CH$_2$)$_{10}$—, or —CH$_2$OC(=O)—); a halogenated alkyl group having from 1 to 10 carbon atoms optionally substituted by at least one of oxygen or nitrogen; —I; —Br; —Cl; —CN; or a cyanoalkyl group having from 2 to 11 carbon atoms and optionally substituted by at least one of fluorine, oxygen, or nitrogen. In some embodiments, X and Y independently represent: a halo group selected from —I, —Br, and —Cl; a cyano group; an acryloxy group; or a methacryloxy group.

Preferably, the polyether unit E comprises monomeric units selected from —(CF$_2$)$_4$O—, —(CF$_2$)$_2$O—, —CF$_2$O—, or a combination thereof such as, for example, combinations of —(CF$_2$)$_4$O— and —(CF$_2$)$_2$O—units; —(CF$_2$)$_4$O—, —(CF$_2$)$_2$O— and —CF$_2$O— units; —(CF$_2$)$_2$O— and —CF$_2$O— units; or —(CF$_2$)$_4$O— and —CF$_2$O— units.

Preferably, x and y are independently integers from 2 to 12, and z is an integer from 0 to 12, wherein the —CF$_2$O— and —(CF$_2$)$_2$O— units, and —(CF$_2$)$_4$O— units if present, are randomly arranged.

The functionalized fluoropolyether may be (and typically is) provided as a mixture of functionalized fluoropolyethers (e.g., having different molecular weight and/or composition).

Useful functionalized fluoropolyethers are typically liquid at 25° C. and about 1 bar (0.1 MPa) for pressure, although this is not a requirement. They may be of relatively low molecular weight. For example, suitable functionalized fluoropolyethers generally have a number average molecular weight of ≤25,000 grams/mole (g/mol), preferably ≤15,000 g/mol. In some embodiments, the functionalized fluoropolyether has a weight average molecular weight (e.g., as can be determined, for example, by size exclusion chromatography) of from 400 to 15,000 g/mol, preferably from 1,200 to 14,900 g/mol, and more preferably from 450 to 9,000 g/mol.

Preferably, the amount of functionalized fluoropolyether(s) in the curable composition is at least 75 weight percent, at least 80 weight percent, or even at least 85 weight percent.

Fluoropolyethers containing free-radically reactive functional groups and their syntheses are known. For example, fluoropolyethers having a backbone characterized by blocks of —CF$_2$CF$_2$O— units can be made from tetrafluoroethylene oxide, as described in U.S. Pat. No. 3,125,599 (Warnell). Others, made by reacting oxygen with tetrafluoroethylene are characterized by a backbone made of repeating —CF$_2$O— units (e.g., see U.S. Pat. No. 3,392,097 (Gozzo et al.)). Fluoropolyethers having a backbone of —C$_3$F$_6$O— units in combination with —CF$_2$O— and —CF(CF$_3$)O— units are described for example in U.S. Pat. No. 3,699,145 (Sianesi et al.). Further useful examples of fluoropolyethers include those having a backbone of repeating —CF$_2$O— and —CF$_2$CF$_2$O— units as disclosed in U.S. Pat. No. 3,810,874 (Mitsch et al.). Fluoropolyethers can also be obtained by the polymerization of hexafluoropropylene oxide (HFPO) using dicarboxylic fluorides as polymerization initiators as described for example in U.S. Pat. No. 4,647,413 (Savu) and U.S. Pat. No. 3,250,808 (Moore et al.). HFPO derived fluoropolyethers are also commercially available, for example, under the trade designation "KRYTOX" from E.I. du Pont de Nemours & Co., Wilmington, Del. Functionalized fluoropolyethers, in particular of the linear type, are also commercially available, for example, as FOMBLIN and FOMBLIN Z DEAL from Solvay Solexis, West Deptford, N.J. and DEMNUM from Daikin Industries Ltd., Osaka, Japan. The conversion of the foregoing commercially available fluoropolyethers to fluoropolyethers containing functional groups suitable for use in the present disclosure can be carried out by known methods of organic synthesis.

For example, fluoropolyethers having cyano groups can be obtained from the corresponding precursor fluoropolyethers as described, for example, in U.S. Pat. No. 3,810,874 (Mitsch et al.); U.S. Pat. No. 4,647,413 (Savu); and U.S. Pat. No. 5,545,693 (Hung et al.). By their way of synthesis, the precursor fluoropolyethers typically have acid fluoride end groups. These acid fluoride end groups may be converted to esters via reaction with an appropriate alcohol (such as methanol). The esters may be subsequently converted to amides via reaction with ammonia. The amides may then be dehydrated to nitriles in an appropriate solvent (such as N,N-dimethylformamide (DMF)) with pyridine and trifluoroacetic anhydride. Alternatively, the amides may be dehydrated with other reagents such as P$_2$O$_5$ or PCl$_3$.

Fluoropolyethers having halo groups (especially iodo groups) can be obtained, for example, from halogen exchange reactions of the fluoropolyether carbonyl fluoride with potassium iodide (KI) or lithium iodide (LiI) as described in U.S. Pat. No. 5,288,376 (Oyama et al.) or by Wlassics et al. in *Journal of Fluorine Chemistry* (2005), vol. 126(1), pages 45-51.

Fluoropolyethers having ethylenically-unsaturated groups can be obtained, for example, from the reaction of fluoropolyether esters with allylamine, diallylamine, or 2-aminoethyl vinyl ether using methods described in U.S. Pat. No. 3,810,874 (Mitsch et al.). Other preparations include dehalogenation of fluoropolyethers such as described in U.S. Pat. No. 5,453,549 (Koike et al.). Fluoropolyethers having an acrylic functional group can be obtained from the corresponding alcohol after reaction with acryloyl chloride in the presence of a tertiary amine (e.g., triethylamine).

Functionalized fluoropolyether is preferably present in an amount of at least 30 weight percent by weight based on the total weight of the curable composition. Typical amounts include at least 35 weight percent or at least 40 weight percent, preferably at least 50 weight percent or even at least 70 weight percent based on the total weight of the curable composition.

Suitable functionalized polysiloxanes have at least one polysiloxane moiety, typically having from 5 to 5000 siloxane units, and at least one (preferably more than one (e.g., at least 2, at least 3, or at least 4) free-radically reactive functional group that is reactive to the free-radical curing system.

Examples of free-radically reactive functional groups include: (i) halo groups selected from iodo groups (—I), bromo groups (—Br), chloro groups (—Cl), and combinations thereof, with one or more iodo groups being preferred;

and (ii) monovalent organic groups containing one or more —I, —Br, —Cl, —CN; and (iii) monovalent free-radically polymerizable ethylenically-unsaturated organic groups (preferably containing from 1 to 10 carbon atoms); for example, as described above with respect to the functionalized fluoropolyether. The functionalized polysiloxanes can have a linear polymer backbone or a branched structure wherein the polymer backbone comprises side chains.

Typically, the functionalized polysiloxanes comprise repeating units of the formula —Si($R_1$)($R_2$)O—, optionally in combination with repeating units of the formula —Si($R_5$)($R_6$)O—, wherein the $R_1$, $R_2$, and $R_5$ independently represent an alkyl group or an aryl group. $R_6$ represents a polysiloxane side chain and/or an alkyl group containing a free-radically reactive functional group and that preferably is situated at a terminal position. In this manner, functional groups that are reactive to radical curing may be provided in side chains of the polymer.

Suitable functionalized polysiloxanes include linear or branched polydialkylsiloxanes, polyalkylarylsiloxanes, and polydiarylsiloxanes containing at least one free-radically reactive functional group located at a terminal position (i.e., in an end group of the polymer backbone and/or in a terminal portion of a side chain). Representative examples of functionalized polysiloxanes having at least one terminal free-radically reactive functional group include those represented by the general formula

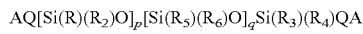
AQ[Si(R)($R_2$)O]$_p$[Si($R_5$)($R_6$)O]$_q$Si($R_3$)($R_4$)QA wherein the groups —Si($R_1$)($R_2$)O— and —Si($R_5$)($R_6$)O— are arranged randomly in the polymer backbone. Each Q independently represents a covalent bond or a linking group containing from 1 to 10 carbon atoms, and is optionally substituted by at least one of sulfur, nitrogen, oxygen, or a combination thereof. Each A independently represents a free-radically polymerizable ethylenically-unsaturated group (e.g., —CH=$CH_2$), —CN, —I, —Br, or —Cl. Each of $R_1$, $R_2$, $R_3$, $R_4$ and $R_5$ independently represents an alkyl group (preferably an alkyl group having from 1 to 4 carbon atoms such as, e.g., methyl, ethyl, propyl, or butyl) or an awl group (preferably an awl group having from 6 to 10 carbon atoms such as, e.g., phenyl or tolyl). Each $R_6$ independently represents a side chain —QA as defined above, p represents an integer in the range of from 2 to 5000, and q represents an integer in the range of from 0 to 1000.

In some embodiments, $R_1$, $R_2$, $R_5$, and $R_6$ are free of fluorine atoms. In some embodiments, the functionalized polysiloxane(s) are free of fluorine atoms.

Particularly suitable functionalized polysiloxanes include di(vinyl-terminated) polysiloxanes that can be represented by the general formula

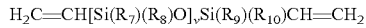
$H_2$C=CH[Si($R_7$)($R_8$)O]$_v$Si($R_9$)($R_{10}$)CH=$CH_2$ wherein each of $R_7$, $R_8$, $R_9$, and $R_{10}$ independently represents an alkyl group having from 1 to 4 carbon atoms or an aryl group having from 6 to 10 carbon atoms, and v is an integer in the range of from 5 to 5000.

Other suitable functionalized polysiloxanes include vinyl-terminated polysiloxanes having vinyl groups in side chains of the polymer and can be represented by the formula

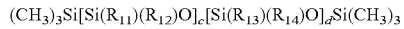
($CH_3$)$_3$Si[Si($R_{11}$)($R_{12}$)O]$_c$[Si($R_{13}$)($R_{14}$)O]$_d$Si($CH_3$)$_3$ wherein each of $R_{11}$, $R_{13}$, and $R_{14}$ independently represent an alkyl group having from 1 to 4 carbon atoms or an aryl group; $R_{12}$ represents a polysiloxane side chain or an alkylene (preferably alkylene having from 1 to 8 carbon atoms) group having a terminal vinyl group; c represents an integer in the range of from 1 to 50; d represents an integer in the range of from 0 to 4999, and p+q is in the range of from 5 to 5000.

The functionalized polysiloxane may be (and typically is) provided as a mixture of functionalized fluoropolyethers (e.g., having different molecular weight and/or composition).

The molecular weight of the functionalized polysiloxane can vary widely. For ease of processing the molecular weight is preferably less than about 500,000 g/mole. Preferably, the molecular weight is from about 500 to about 400,000 g/mol, more preferably from about 500 to about 200,000 g/mol.

The viscosity of the functionalized polysiloxane can vary widely. Useful functionalized polysiloxanes may have a viscosity between about 1 and 300,000 centipoise (cps) (between about 1 and 300,000 mPa-sec), preferably between about 100 and 10,000 cps (between about 100 and 10,000 mPa-sec).

In some embodiments, it may be advantageous to use a functionalized polysiloxane that is liquid at ambient conditions (i.e., 25° C. and about 1 bar) in combination with a liquid functionalized fluoropolyether for making a liquid or semi-liquid curable composition for making fluoropolyether-polysiloxane elastomers as this may allow the use of injection molding processes or reduces the costs for injection molding. The viscosity can be conveniently adapted by varying the molecular weight of the functionalized polysiloxane and/or by adding fillers to create a more paste-like consistency.

A variety of functionalized polysiloxanes having at least one terminal vinyl group are commercially available from GELEST, Inc., Morrisville, Pa., including, for example, vinyl-terminated polydimethylsiloxanes, vinyl-terminated diphenylsiloxane-dimethylsiloxane copolymers, vinyl-terminated polyphenylmethylsiloxanes, and vinyl-terminated diethylsiloxane-dimethylsiloxane copolymers.

Preferably, the functionalized polysiloxane is free of silicon-hydrogen bonds.

The free-radical curing system may comprise a single free-radical initiator or a combination of two or more free-radical generating compounds. Useful free-radical-generating compounds include thermal initiators (e.g., peroxides and some azo compounds) and photoinitiators (e.g., Norrish Type I and/or Type II photoinitiators), which generate free-radicals upon activation. Activation is preferably achieved by application of thermal energy. Organic peroxides such as, for example, dialkyl peroxides or bis(dialkyl) peroxides are particularly useful. Compounds decomposing to produce free-radicals at a temperature above 50° C. are preferred. In many cases, it is preferred to use a di(t-butyl) peroxide having a tertiary carbon atom attached to the peroxy oxygen. Among the most useful peroxides of this type are 2,5-dimethyl-2,5-di(t-butylperoxy)hex-3-yne and 2,5-dimethyl-2,5-di(t-butylperoxy)hexane. Other peroxides can be selected from compounds such as but not limited to dicumyl peroxide, dichorobenzoyl peroxide, t-butyl perbenzoate, α,α'-bis(t-butylperoxy)-p-diisopropylbenzene (i.e., dicumyl peroxide), and di[1,3-dimethyl-3-(t-butylperoxy)-butyl]carbonate.

Typically, about 2 to 10 parts of the free-radical curing system per 100 parts of functionalized fluoropolyether and functionalized polysiloxane are used, but this is not a requirement. In the case that functional groups of the functionalized fluoropolyether and/or functionalized polysiloxane comprise nitriles, the crosslink density of the cured fluoropolyether-polysiloxane elastomer can be increased by adding an additional crosslinker that will cause crosslinking through the formation of triazine groups in addition to radical crosslinking. Useful examples of such additional crosslinking agents include tetraphenyltin and perfluorosebacamidine.

The free-radical curing system may additionally include at least one coagent to facilitate curing. Useful coagents comprise at least two functional groups capable of reacting with the functional groups of the functionalized fluoropolyether and the functional groups of the functionalized polysiloxane under radical conditions to provide crosslinking. In a preferred embodiment, the coagent includes a polyunsaturated compound capable of reacting with the functional groups of the functionalized fluoropolyether and the functionalized polysiloxane in the presence of a free-radical-generating compound under the formation of crosslinks.

Suitable coagents include, for example, fluorinated olefins such as divinylperfluorohexane, and polyhalogenated organic compounds such as, for example, $CBr_4$ and pentaerythritol tetrabromide. In some embodiments, the coagent is selected from polyvinyl or polyallyl compounds. Examples include triallyl cyanurate, triallyl isocyanurate (TAIC), triallyl trimellitate, tri(methylallyl) isocyanurate, tris(diallylamine)-s-triazine, triallyl phosphite, N,N-diallylacrylamide, N,N,N',N',N'',N''-hexaallylphosphoramide; N,N,N',N'-tetraallylterephthalamide; N,N,N',N'-tetraallylinalonamide; trivinyl isocyanurate; methyl-2,4,6-trivinyltrisiloxane; N,N'-m-phenylenebismaleimide; diallyl phthalate, and tri(5-norbornyl-2-methylene) cyanurate. A particular suitable coagent is triallyl isocyanurate.

The coagent is typically present in an amount of from 0 to 20 parts per hundred by weight (pph), preferably between 0 and 10 pph, of the functionalized fluoropolyether and functionalized polysiloxane combined. The coagent may be added as such or it may be present on a carrier. A typical example for a carrier is silica.

The curable composition may optionally, but typically, further comprise filler and/or other additives. Preferably, the curable composition further comprises at least one filler (collectively referred to as "filler"). In preferred embodiments, the curable composition is a liquid or paste. Filler may be added to increase the viscosity to obtain a paste-like consistency. A paste-like consistency typically has a Brookfield viscosity of from 2,000 to 50,000 cps (from 2,000 to 50,000 mPa-sec) at 25° C.

In embodiments where the curable composition comprises highly viscous functionalized polysiloxanes, fillers may be used to facilitate mixing of the functionalized fluoropolyether with the functionalized polysiloxane. For example, the functionalized fluoropolyether may be pre-dispersed onto the filler. The pre-dispersed functionalized fluoropolyether can then more easily be dispersed into and blended with the functionalized polysiloxane. Filler can also be used to modify or adapt the rheological and/or physical properties of the cured fluoropolyether-polysiloxane compositions.

Filler typically comprises particles that may be spherical or non-spherical (e.g., crushed particulate material or fibers). Typically, the filler is micrometer-scale in size. Typically, they have a least one dimension being a length or a diameter of from about 0.5 microns (um) up to about 100, 1000, or 5000 microns. Preferred filler includes carbon particles and silica-containing particles with average particle sizes ($D_{50}$) in the range of from 0.5 microns to 30 microns.

Suitable filler includes inorganic or organic materials. Useful examples include sulfates (e.g., barium sulfate), carbonates (e.g., calcium carbonate), and silicates. Examples of useful silicates include silicas such as hydrophilic and hydrophobic silica, fumed silica (e.g., available under the trade designation "AEROSIL" from Evonik GmbH, Frankfurt, Germany, or under the trade designation "NANOGEL" from Cabot Corporation, Boston, Mass.), and silane-treated fumed silicas (e.g., as available under the trade designation CABOSIL from Cabot Corporation), and combinations thereof. Specific examples of fumed silicas include AEROSIL 200, AEROSIL R972, and AEROSIL R974 fumed silicas.

Further examples of silicates include calcium silicates, aluminum silicates, magnesium silicates, and mixtures thereof (e.g., mica, clays), and glasses (e.g., hollow glass microspheres available under the trade designation GLASS BUBBLES from 3M Company). Further suitable fillers include halogen-modified silicas, such as 3-halopropyltriethoxysilane or nitrile-modified silicas. Nitrile-modified silicas can for example be prepared by reacting a commercially available hydroxyl-containing silica (e.g., AEROSIL 200V densified hydrophilic fumed silica available from Evonik Degussa, Essen, Germany) with a cyanoalkylsilane such as, for example, 3-cyanopropyltriethoxysilane (available from Aldrich Chemical Co., Milwaukee, Wis.), in the presence of ethanol containing hydrochloric acid. The amount of reactants is chosen so as to obtain between 10 and 30 weight percent of cyano groups in the resultant nitrile-modified silica.

Further suitable silica-containing fillers include fluorine-modified silicas. Fluorine-modified silicas can be prepared, for example, by reacting a commercially available hydroxyl-containing silica, (for examples AEROSIL 200V) with a fluorinated organosilane. A suitable fluorinated organosilane includes HFPO-silanes, which may be prepared from oligomeric HFPO-esters and a silane such as, for example, aminoalkyltrialkoxysilane as is described in U.S. Pat. No. 3,646,085 (Bartlett). Fluorinated organosilanes can also be derived from commercially available fluoropolyethers (e.g., FOMBLIN Z Deal fluoropolyether from Solvay Solexis, West Deptford, N.J.) by reaction with aminoalkyltrialkoxysilanes (e.g., 3-aminopropyltrimethoxysilane) as described in U.S. Pat. No. 6,716,534 (Moore et al.). The amounts of the reactants are typically chosen so as to obtain between 1 and 5 weight percent of fluorine in the resultant fluorine-modified silica.

Other examples of suitable fillers include carbon materials such as, for example, nano-sized carbon particles (e.g., mesoporous carbon nanopowder available from Sigma-Aldrich Corp., St. Louis, Mo.), carbon nanotubes, carbon blacks (e.g., acetylene black, channel black, furnace black, lamp black, or thermal black), modified carbons (e.g., $CF_x$ available as CARBOFLUOR from Advance Research Chemicals, Catoosa, Okla.). Carbon black is commercially available, for example, from Cabot Corporation.

Filler is preferably added in an amount of from 1 to 50 pph, more preferably from 4 to 30 pph, based on the combined weight of functionalized fluoropolyether and functionalized polysiloxane, although other amounts may also be used.

The curable compositions (and also the cured fluoropolyether-polysiloxane elastomer compositions) may include further additives, such as for example acid acceptors. Such acid acceptors can be inorganic or blends of inorganic and organic acid acceptors. Examples of inorganic acceptors include magnesium oxide, lead oxide, calcium oxide, calcium hydroxide, dibasic lead phosphate, zinc oxide, strontium hydroxide, hydrotalcite, and zeolites (e.g., ZEOFLAIR inorganic powder available from Zeochem AG, Karst, Germany). Organic acceptors include epoxies, sodium stearate, and magnesium oxalate. Particularly suitable acid acceptors include magnesium oxide and zinc oxide. Combinations of acid acceptors may also be used. The amount of acid acceptor will generally depend on the nature of the acid acceptor used. Typically, the amount of acid acceptor used is between 0 and 5 pph based on the total combined weight of functionalized fluoropolyether and functionalized polysiloxane.

Further useful additives include stabilizers, plasticizers, pigments, antioxidants, processing aids, rheology modifiers, lubricants, flame retardants, flame retardant synergists, antimicrobials, and further additives known in the art of fluoropolymer and/or polysiloxane compounding and rubber processing.

The curable composition may be prepared by mixing the requisite components using known mixing devices such as, for example, rotary mixers, planetary roll mixers, acoustic mixers, and high-shear mixers. The temperature of the mixture during mixing typically should not rise above the temperature at which curing begins, typically below about 120° C. The curable composition mixture can be placed in a mold and cured.

Curing may be carried out in open air (e.g., in a pressureless open mold or hot air tunnel) but is preferably carried out in a closed mold. Curing in closed molds offers the advantage of not exposing the operators to fumes generated during the curing reaction. In an alternative embodiment, curing can be done in an autoclave.

In order to improve mixing, it is recommended to first mix the functionalized fluoropolyether with filler to pre-disperse the functionalized fluoropolyether. For good mixing with the functionalized polysiloxane, it is preferred that the mixture of the functionalized fluoropolyether and the filler is in the form of a powder. To this mixture may be added further fillers and additives. Preferably, mixing is accomplished using a planetary mixer or a high shear mixer.

Compositions comprising fluoropolyether-polysiloxane elastomers are obtainable by curing the curable composition. Curing is typically achieved by heat-treating the curable fluoropolyether-polysiloxane composition. The heat-treatment is carried out at an effective temperature and effective time to create a crosslinked composition. The heat-treatment activates the free-radical-generating compound to produce free-radicals. Optimum conditions can be tested by examining the resulting cured composition for its mechanical and physical properties. Typically, curing is carried out at temperatures of at least 120° C., at least 150° C., or even at least 170° C. Typical curing conditions include curing at temperatures in the range of from 160° C. to 210° C., from 160° C. to 190° C. Typical curing periods include from 0.5 to 30 minutes. Curing is preferably carried out under pressure. For example, pressures of from 10 to 100 bars (1 to 10 MPa) may be applied. A post-curing cycle may be applied to ensure the curing process is fully completed. Post-curing may typically be carried out at temperatures in the range of from 170° C. to 250° C. for a period of from one to 24 hours.

The result of curing the curable composition is a composition comprising a fluoropolyether-polysiloxane elastomer. In some embodiments, the fluoropolyether-polysiloxane elastomer comprises a fluoropolyether-polysiloxane-based polymer containing fluoropolyether segments having a weight average molecular weight in the range of from 400 g/mol to 25,000 g/mole, more preferably from 400 g/mol to 15,000 g/mol, and containing a plurality of monomeric units selected from —$C_4F_8O$—, —$C_3F_6O$—, —$C_2F_4O$—, —$CF_2O$—, or a combination thereof, and polysiloxane segments (preferably polydimethylsiloxane segments) having a molecular weight in the range of from 500 g/mol and 500,000 g/mol, preferably from 500 to 400,000 g/mol, more preferably from 500 to 200,000 g/mol.

Fluoropolyether-polysiloxane elastomers according to the present disclosure typically have at least one glass transition temperature of less than about −40° C., less than about −50° C., less than −60° C., less than −80° C., or even less than −100° C. Depending on the ratio of the functionalized fluoropolyether to functionalized polysiloxane, two distinct glass transition temperatures may be observed.

In addition to low-temperature properties, fluoropolyether-polysiloxane elastomer-based cured compositions also have high chemical resistance. For example, shaped articles made from the fluoropolyether-polysiloxane elastomers typically have a volume swell in acetone of less than 100 percent, preferably less than 80 percent, and more preferably less than 50 percent. In order to provide high chemical resistance, the fluorine content of the fluoropolyether-polysiloxane elastomer is desirably high (e.g., at least 41 weight percent, at least 52 weight percent, or even at least 56 weight percent based on the total weight of the cured composition).

Fluoropolyether-polysiloxane elastomer-based compositions have a rubber-like consistency and elastomeric properties. For example, they can typically be stretched to at least 10 percent of their initial length by applying a suitable force and return to their original length after that force is no longer applied. The fluoropolyether-polysiloxane elastomer compositions typically reach a maximum torque (MH), measured according to ASTM D 5289-93a, of greater than 4 inch-pounds (0.4 newton-meter).

Exemplary useful shaped articles obtainable by injection molding or compression molding the curable composition (with curing) include gaskets, shaft seals, bearings, hoses, and O-rings.

SELECT EMBODIMENTS OF THE PRESENT DISCLOSURE

In a first embodiment, the present disclosure provides a curable composition comprising:
a functionalized fluoropolyether comprising:
  a polymer backbone comprising at least one divalent monomeric unit selected from the group consisting of —$C_4F_8O$—, —$C_3F_6O$—, —$C_2F_4O$—, —$CF_2O$—, and combinations thereof;
  at least one first free-radically reactive functional group bonded at a terminal position or at a position that is adjacent to the terminal position of the polymer backbone, wherein said at least one first free-radically reactive functional group is selected from the group consisting of: —I; —Br; —Cl; —CN; monovalent organic groups containing at least one —I, —Br, —Cl, —CN; and monovalent free-radically polymerizable ethylenically-unsaturated organic groups;
a functionalized polysiloxane comprising at least one second free-radically reactive functional group selected from the group consisting of: —I; —Br; —Cl; —CN; monovalent organic groups containing at least one —I, —Br, —Cl, —CN; and monovalent free-radically polymerizable ethylenically-unsaturated organic groups; and
an effective amount of a free-radical curing system.

In a second embodiment, the present disclosure provides a curable composition according to the first embodiment, further comprising filler.

In a third embodiment, the present disclosure provides a curable composition according to the first or second embodiment, wherein the filler is selected from the group consisting of silicate fillers, carbon fillers, and combinations thereof.

In a fourth embodiment, the present disclosure provides a curable composition according to any one of the first to third embodiments, further comprising at least one coagent comprising at least two third functional organic groups, wherein the at least two third function organic groups are selected from the group consisting of: —I; —Br; —Cl; —CN; monovalent organic groups containing at least one —I, —Br, —Cl, —CN; and monovalent free-radically polymerizable ethylenically-unsaturated organic groups.

In a fifth embodiment, the present disclosure provides a curable composition according to any one of the first to fourth embodiments, wherein the at least one free-radical generating compound comprises a peroxide.

In a sixth embodiment, the present disclosure provides a curable composition according to any one of the first to fifth embodiments, wherein the functionalized fluoropolyether has a number average molecular weight of from 400 to 15,000 grams per mole.

In a seventh embodiment, the present disclosure provides a curable composition according to any one of the first to sixth embodiments, wherein the functionalized fluoropolyether comprises a random copolymer represented by the general formula

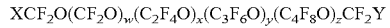

$$XCF_2O(CF_2O)_w(C_2F_4O)_x(C_3F_6O)_y(C_4F_8O)_zCF_2Y$$

wherein w, x, y and z independently represent integers ranging from 0 to 30, with the proviso that w+x+y+z≥6; and X and Y independently represent: a free-radically polymerizable ethylenically-unsaturated group —Z—CW=CW$_2$, wherein each W independently represents H, Cl, F or CF$_3$, and Z represents a covalent bond or an alkylene group having from of 1 to 10 carbon atoms and optionally substituted by at least one fluorine, chlorine, oxygen, nitrogen, sulfur, or a combination thereof, and with the proviso that at least one W is H; a halogenated alkyl group having from 1 to 10 carbon atoms and optionally substituted by at least one oxygen, nitrogen, or a combination thereof; —I; —Br; —Cl; —CN; or a cyanoalkyl group having from 2 to 11 carbon atoms and optionally substituted by at least one fluorine, oxygen, nitrogen, or a combination thereof.

In an eighth embodiment, the present disclosure provides a curable composition according to any one of the first to seventh embodiments, wherein the functionalized polysiloxane is represented by the formula

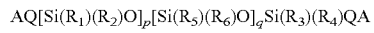

$$AQ[Si(R_1)(R_2)O]_p[Si(R_5)(R_6)O]_qSi(R_3)(R_4)QA$$

wherein the organic groups —[Si(R$_5$R$_6$)O]$_q$— and —[Si(R$_1$R$_2$)O]$_p$ are placed randomly;
  each Q independently represents a covalent bond or a linking group containing from 1 to 10 carbon atoms, and is optionally substituted by at least one of sulfur, nitrogen, oxygen, or a combination thereof;
  each A independently represents a free-radically polymerizable ethylenically-unsaturated group, —CN, —I, —Br, or —Cl;
  each R$_1$, R$_2$, R$_3$, R$_4$ and R$_5$ independently represent an alkyl group or an aryl group;
  each R$_6$ independently represents a side chain —QA;
  p represents an integer in the range of 2 to 5000; and
  q is 0 or an integer in the range of 1 to 1000.

In a ninth embodiment, the present disclosure provides a curable composition according to any one of the first to eighth embodiments, wherein the functionalized polysiloxane is free of Si—H bonds.

In a tenth embodiment, the present disclosure provides a curable composition according to any one of the first to ninth embodiments, wherein the functionalized polysiloxane is free of fluorine.

In an eleventh embodiment, the present disclosure provides a curable composition according to any one of the first to tenth embodiments, wherein the functionalized polysiloxane has at least two terminal vinyl groups.

In a twelfth embodiment, the present disclosure provides a curable composition according to any one of the first to eleventh embodiments, wherein on a total weight basis the curable composition comprises comprising:
  10 to 90 weight percent of the functionalized fluoropolyether; and
  90 to 10 weight percent of the functionalized polysiloxane.

In a thirteenth embodiment, the present disclosure provides a method of making a composition comprising a fluoropolyether-polysiloxane elastomer, the method comprising:
  providing a curable composition according of any one of the first to twelfth embodiments; and
  free-radically curing the curable composition.

In a fourteenth embodiment, the present disclosure provides a shaped article obtained by injection or compression molding the curable composition according of any one of the first to twelfth embodiments.

In a fifteenth embodiment, the present disclosure provides a shaped article according to the fourteenth embodiment, wherein the shaped article comprises at least one of a gasket, shaft seal, bearing, hose, or O-ring.

In a sixteenth embodiment, the present disclosure provides a fluoropolyether-polysiloxane elastomer having a polymer backbone comprising:
  fluoropolyether segments having a number average molecular weight of 400 to 15,000 grams per mole, wherein the fluoropolyether segments comprise at least one divalent monomeric unit selected from the group consisting of —C$_4$F$_8$O—, —C$_3$F$_6$O—, —C$_2$F$_4$O—, —CF$_2$O—, and combinations thereof; and
  polysiloxane segments having a molecular weight of from 500 to 500,000 grams per mole, wherein the polysiloxane segments are covalently bonded to the backbone fluoropolyether segments.

In a seventeenth embodiment, the present disclosure provides a fluoropolyether-polysiloxane elastomer according to the sixteenth embodiment, wherein the fluoropolyether-polysiloxane elastomer has a volume swell in acetone of less than 100 percent.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Test Methods
Hardness:
Hardness Shore A (2", 5 cm)) was measured according to ASTM D-2240 on samples that were cured 7 minutes at 177° C.
Glass Transition Temperature ($T_g$):
$T_g$ was measured by modulated temperature differential scanning calorimetry (DSC) using a TA Instruments Q200 modulated DSC from TA Instruments, New Castle, Del. Conditions of measurement were: −150° C. to 50° C. at 2 or 3° C./minute, modulation amplitude of ±1° C./minute during 60 seconds.
Curing Properties:
Vulcanization properties were measured using an Alpha Technologies Moving Die Rheometer (MDR) (at 177° C. in accordance with ASTM D 5289-93a, reporting minimum torque (ML), maximum torque (MH) and delta torque (which is the difference between MH and ML). Torque values are reported in in-lbs (cm-kg). Also reported are tan delta (i.e., loss modulus/storage modulus) at ML and tan delta at MH. Further reported are parameters indicating the curing speed such as Ts2 (the time required to increase the torque by two units over the ML); Tc50 (the time to increase torque above ML by 50% of delta torque), and Tc90 (the time to increase torque above ML by 90% of delta torque), all of which were reported in minutes.
Solvent Resistance
Fluoropolyether-polysiloxane elastomer compositions were aged at 23° C. in acetone for 24 hours. After aging, the percent volume swell (i.e., 100×(swelled volume−initial volume)/initial volume) was determined.
Materials Used in the Examples
PFE-1: $ICF_2O(CF_2O)_{9-11}(CF_2CF_2O)_{9-11}CF_2I$ A 1-liter 3-neck round-bottom flask was charged with 500 g (0.25 mol) of the perfluoropolyether diester $CH_3OC(=O)CF_2O(CF_2O)_{9-11}(CF_2CF_2O)_{9-11}CF_2C(=O)OCH_3$ (number average molecular weight of about 2,000 g/mol, obtained as FOMBLIN Z-DEAL from Solvay Solexis), and 100 g of FLUORINERT FC-77 perfluorinated liquid solvent from 3M Company with stirring. A solution of 37 g (0.56 mol) of KOH in 100 g of water was added over 15 minutes, and the mixture was heated at a light reflux for 30 minutes. The mixture was placed on a tray, and dried in a vacuum oven to give 512 g of a perfluoropolyether dipotassium acid salt. A 50 weight percent solids solution was made in water and acidified with concentrated $H_2SO_4$, extracted into FLUORINERT FC-77 perfluorinated liquid solvent, filtered, and the solvent stripped to isolate 451 g (0.23 mol) of perfluoropolyether diacid (PFPE diacid).

A 1-liter 3-neck round-bottom flask was charged with 450 g (0.23 mol) of PFPE diacid, 10 drops of N,N-dimethylformamide, and 95 g (0.80 mol) of thionyl chloride was added over 30 minutes and heated to 88° C. for 20 hours to give the corresponding perfluoropolyether diacid chloride. The PFPE diacid chloride was stirred with 53 g (0.91 mol) of KF, heated for 20 hours at 65° C., extracted into FLUORINERT FC-77 perfluorinated liquid solvent, filtered, and the solvent stripped to give 366 g (0.19 mol) of perfluoropolyether diacid fluoride. A 1-liter 3-neck round bottom flask was charged with 350 g (0.18 mol) of the perfluoropolyether diacid fluoride and 66 g (0.49 mol) of LiI and heated with stirring to 190° C. for 2 hours with off gassing.

The reaction was followed by $^{19}F$ NMR to determine when the reaction was done. When reaction was essentially complete, the reaction mixture was extracted into FLUORINERT FC-77 perfluorinated liquid solvent, filtered, and the solvent was stripped to give 320 g (0.15 mol) of PFE-1 in an overall 60% yield.

PFE-2: $CH_2=CHC(=O)OCH_2CF_2O(CF_2O)_{9-11}(CF_2CF_2O)_{9-11}CF_2CH_2OC(=O)CH=CH_2$

FOMBLIN Z-DEAL perfluoropolyether diester (250 g), 800 g of dry tetrahydrofuran, and 600 g of FLUORINERT HFE 7200 electronic fluid (3M Company, St. Paul, Minn.) were charged in a 2-liter flask. Next, 18 g of $ZnCl_2$ and 5 g of N,N-dimethylcyclohexylamine were added. The mixture was placed under a nitrogen atmosphere and stirred at 20° C. Sodium borohydride (10.025 g) was added in parts of 0.5 g every 15 min. The reaction was warmed to 60° C., and stirred for 16 h. The reaction mixture was cooled on an ice bath, and 850 ml of 2.5 M HCl solution was slowly added resulting in strong gas formation. The mixture was transferred to a separatory funnel, and the organic phase was drained off. The organic phase was washed 2 times with 300 ml water and dried over anhydrous magnesium sulfate. Finally, the FLUORINERT HFE 7200 electronic fluid was stripped off resulting in 240 g of the corresponding diol.

In a subsequent step 50 g of the diol (0.026 mol) was mixed with 80 ml of FLUORINERT HFE 7200 electronic fluid and 5.36 g of triethylamine (0.053 mol). The mixture was placed under nitrogen, and 4.65 g acryloyl chloride (0.051 mol) was slowly added with stirring over 4 h at 20° C. The mixture was stirred overnight at 20° C. Afterwards, the formed HCl salt was filtered off and the FLUORINERT HFE 7200 electronic fluid was removed with a rotary evaporator.

PFE-3: $CH_2=CHC(=O)OCH_2CF(CF_3)O[CF_2CF(CF_3)O]_nC_4F_8O[CF(CF_3)CF_2O]_nCF(CF_3)-CH_2OC(=O)CH=CH_2$

A 600-ml Parr reactor was charged with 47 g (0.24 mol) of perfluorosuccinyl fluoride (from Exfluor Research Corporation, Round Rock, Tex.), 7 g (0.12 mol) of KF, and 100 g of tetraglyme, and cooled to 0° C. Next, 548 g (3.3 mol) of hexafluoropropylene oxide (from E.I. du Pont de Nemours and Co., Wilmington, Del.) was added over four hours as described in U.S. Pat. No. 3,250,807 (Fritz et al.). A total of six reactions were completed, combined, reacted with excess methanol, and washed with water to isolate 2540 g oligomeric hexafluoropropylene oxide dimethyl ester of 2400 g/mol number average molecular weight. A 5-liter 3-neck round-bottom flask equipped with a mechanical stirrer and nitrogen bubbler was charged with 1 kg of glyme and 36 g (0.95 mol) of sodium borohydride, followed by addition of 750 g (0.31 mol) of the oligomeric hexafluoropropylene oxide dimethyl ester over one hour and heating to 86° C. for two hours. The resultant mixture was cooled to 25° C., and 250 g of 50% sulfuric acid was added, resulting in 702 g of the corresponding oligomeric hexafluoropropylene oxide diol. To a 500-ml 3-neck round bottom flask was added 100 g (0.04 mol) of the oligomeric hexafluoropropylene oxide diol, 9.4 g (0.09 mol) of triethylamine, and 100 g of methyl t-butyl ether and the mixture was stirred. Addition of 8.4 g (0.09 mol) of acryloyl chloride over thirty minutes at a slight reflux resulted in formation of a precipitate. FLUORINERT FC-77 fluorinated liquid (200 g, 3M Company) was added and the precipitate was removed by filtration. The filtrate was placed on a rotary evaporator at 50° C./10 torr (1.3 kPa) resulting in 75 g (0.03 mol) of the corresponding oligomeric hexafluoropropylene oxide diacrylate (PFE-3) with a 2280 g/mol number average molecular weight.

Functionalized Polysiloxanes:

| POLYSILOXANE | TRADE DESIGNATION | COMPOSITION | COMPANY |
|---|---|---|---|
| SIL-1 | VGF 991 | (98-9% trifluoropropyl-methylsiloxane) (1-2% vinylmethylsiloxane) copolymer gum | Gelest Inc. |
| SIL-2 | FMV 4031 | Vinyl-terminated (35-45 mol % trifluoropropylmethylsiloxane ($M_w$ = 25,000-35,000 g/mol, density 1.122 g/cm$^3$). | Gelest Inc. |
| SIL-3 | DMS V05 | Vinyl-terminated polydimethyldisiloxane (VMQ), $M_w$ = 800 g/mol | Gelest Inc. |
| SIL-4 | DMS V21 | Vinyl-terminated polydimethyldisiloxane (VMQ), $M_w$ = 6000 g/mol | Gelest Inc. |
| SIL-5 | DMS V31 | Vinyl-terminated polydimethyldisiloxane (VMQ), $M_w$ = 2800 g/mol | Gelest Inc. |
| SIL-6 | DMS V35 | Vinyl-terminated polydimethyldisiloxane (VMQ), $M_w$ = 49,500 g/mol | Gelest Inc. |
| SIL-7 | DMS V42 | Vinyl-terminated polydimethyldisiloxane (VMQ), $M_w$ = 72,000 g/mol | Gelest Inc. |
| SIL-8 | DMS V46 | Vinyl-terminated polydimethyldisiloxane (VMQ), $M_w$ = 117,000 g/mol | Gelest Inc. |
| SIL-9 | DMS V52 | Vinyl-terminated polydimethyldisiloxane (VMQ), $M_w$ = 155,000 g/mol | Gelest Inc. |
| SIL-10 | Bluestar FP3260U | fluoro silicone | Bluestar Silicones, Rock Hill, South Carolina |

List of Additives:

COAG1: 70% triallyl isocyanurate on silica carrier, obtained as LUVOMAXX TAIC DL 70 coagent from Lehmann & Voss, Hamburg, Germany.

INIT1: organic peroxide, available as TRIGONOX 101-50D-PD thermal initiator from Akzo Nobel, Amsterdam, The Netherlands.

CTS1: matting agent, hydrophobic chemically-treated silica particles available as NANOGEL TLD201 matting agent from Cabot Corporation, Boston, Massachusetts.

CTS2: CABOSIL TS530 high surface area fumed silica which has been surface modified with hexamethyldisilazane from Cabot Corporation.

ZnO: nanoparticulate zinc oxide obtained as ADNANO zinc oxide from Evonik Industries, Essen, Germany.

General Procedure for Sample Preparation

In a first step, the liquid functionalized fluorinated polyether was mixed with CTS1 in a SPEEDMIXER variable speed mixer (Model DAC 150), available from Flack Tek, Inc., Landrum, S.C.), operating for 1 minute (min) at 2000 revolutions per minute (rpm) and for 1 min at 3500 rpm. The resultant mixture was in the form of a powder, which was then further mixed with the indicated polysiloxane compound, fillers, and other additives as indicated. Curing was carried out at 177° C. for 7 min at an applied pressure of 20 bar (2 mPa).

COMPARATIVE EXAMPLES A-C

Comparative Examples A-C were prepared by curing high molecular weight commercially available (fluorinated) polydimethylsiloxane SIL-10 (Comparative Example A) or SIL-1 (Comparative Examples B and C) to which were added peroxide and COAG1 as reported in Table 1. The compositions were press-cured at 177° C. for 7 min. The samples were tested for their rheological properties and their solvent resistance. The results are reported in Table 1 (below).

TABLE 1

|  | COMP. EX. A | COMP. EX. B | COMP. EX. C |
|---|---|---|---|
| Composition | | | |
| SIL-10 | 100 | 0 | 0 |
| SIL-1 | 0 | 100 | 100 |
| INIT1 | 1 | 5 | 5 |
| COAG1 | 0 | 0 | 3 |
| Properties ALPHA TECHNOLOGIES MDR at 177° C. | | | |
| Minutes | 6 | 6 | 12 |
| ML, in-lb | 1.41 | 0.20 | 0.18 |
| (cm-kg) | (1.62) | (0.23) | (0.21) |
| MH, in-lb | 11.34 | 2.42 | 3.32 |
| (cm-kg) | (13.07) | (2.79) | (3.83) |
| MH-ML, in-lb | 9.93 | 2.22 | 3.14 |
| (cm-kg) | (11.44) | (2.56) | (3.62) |
| Tan delta at ML | 0.801 | 1.05 | 1 |
| Tan delta at MH | 0.063 | 0.004 | 0.003 |
| Ts2, min | 0.62 | 2.51 | 0.77 |
| Tc50, min | 1.11 | 0.65 | 0.62 |
| Tc90, min | 3.16 | 2.51 | 2.24 |

TABLE 1-continued

|  | COMP. EX. A | COMP. EX. B | COMP. EX. C |
| --- | --- | --- | --- |
| MDSC, ° C. | | | |
| Glass Transition | −70.19 | −69.59 | −69.53 |
| Solvent Resistance, acetone | | | |
| Volume Swell, % | 255 | 370 | 283 |

EXAMPLES 1-3 and COMPARATIVE EXAMPLE D

In Examples 1 to 3, curable fluoropolyether-polysiloxane compositions were prepared by mixing functionalized fluoropolyether PFE-1 with compounds as reported in Table 2 according to the *General Procedure for Sample Preparation*. Comparative Example D was prepared by curing high molecular weight commercially available fluorinated polydimethylsiloxane SIL-2 to which was added peroxide and CTS1 as indicated in Table 2. The compositions were press-cured at 177° C. for 7 min The samples were tested for their curing behavior, glass transition temperature, and solvent-resistance. Results are reported in Table 2 (below).

TABLE 2

| | EXAMPLE 1 | EXAMPLE 2 | EXAMPLE 3 | COMPARATIVE EXAMPLE D |
| --- | --- | --- | --- | --- |
| Composition | | | | |
| PFE-1 | 50 | 100 | 100 | 0 |
| SIL-2 | 50 | 0 | 0 | 100 |
| SIL-3 | 0 | 36.4 | 33.5 | 0 |
| SIL-4 | 0 | 0 | 21.45 | 0 |
| INIT1 | 5 | 5 | 5 | 5 |
| COAG1 | 5 | 0 | 0 | 0 |
| CTS1 | 8 | 8 | 12 | 8 |
| ALPHA TECHNOLOGIES MDR at 177° C. | | | | |
| Minutes | 6 | 6 | 12 | 6 |
| ML, in-lb | 0.64 | 0.14 | 0.32 | 0.16 |
| (cm-kg) | (0.74) | (0..16) | (0.37) | (0.18) |
| MH, in-lb | 7.91 | 4.62 | 5.03 | 5.9 |
| (cm-kg) | (9.11) | (5.32) | (5.80) | (6.80) |
| MH-ML, in-lb | 7.27 | 4.48 | 4.71 | 5.74 |
| (cm-kg) | (8.38) | (5.16) | (5.43) | (6.61) |
| Tan delta at ML | 0.406 | 0.286 | 0.312 | 0.5 |
| Tan delta at MH | 0.056 | 0.279 | 0.193 | 0.014 |
| Ts2, min | 0.31 | 1.62 | 1.53 | 0.77 |
| Tc50, min | 0.36 | 1.73 | 1.68 | 0.9 |
| Tc90, min | 1.43 | 3.66 | 3.36 | 1.98 |
| MDSC, ° C. | | | | |
| Glass Transition | −104.7 | −113.6 | −117.2 | −103.3 |
| Solvent Resistance, acetone | | | | |
| Volume Swell, % | 80 | 20 | 23 | 134 |

EXAMPLES 4-8

In Examples 4-8, curable fluoropolyether-polysiloxane compositions were prepared by mixing functionalized fluoropolyether PFE-2 with compounds as reported in Table 3 according to the *General Procedure for Sample Preparation*. The compositions were press-cured at 177° C. for 7 min The samples were tested for their curing behavior, glass transition temperature, and solvent resistance. Results are reported in Table 3 (below).

TABLE 3

| | EXAMPLE 4 | EXAMPLE 5 | EXAMPLE 6 | EXAMPLE 7 | EXAMPLE 8 |
| --- | --- | --- | --- | --- | --- |
| Composition | | | | | |
| PFE-2 | 100 | 100 | 100 | 100 | 100 |
| SIL-5 | 44.8 | 0 | 0 | 0 | 0 |
| SIL-6 | 0 | 50 | 0 | 0 | 0 |
| SIL-7 | 0 | 0 | 50 | 0 | 0 |
| SIL-8 | 0 | 0 | 0 | 50 | 0 |
| SIL-9 | 0 | 0 | 0 | 0 | 50 |
| INIT1 | 5 | 5 | 5 | 5 | 5 |
| CTS1 | 8 | 8 | 8 | 8 | 8 |
| CTS2 | 7.91 | 15 | 15 | 15 | 15 |
| ZnO | 1 | 1 | 1 | 1 | 1 |
| ALPHA TECHNOLOGIES MDR at 177° C. (6 min) | | | | | |
| ML, in-lb | 0.25 | 0.31 | 0.43 | 0.35 | 0.37 |
| (cm-kg) | (0.29) | (0.36) | (0.50) | (0.40) | (0.43) |
| MH, in-lb | 22.99 | 18.95 | 17.19 | 17.79 | 17.54 |
| (cm-kg) | (26.49) | (21.83) | (19.81) | (20.50) | (20.21) |
| MH-ML, in-lb | 22.74 | 18.64 | 17.76 | 17.44 | 17.17 |
| (cm-kg) | (26.20) | (21.48) | (20.46) | (20.09) | (19.78) |
| Tan delta at ML | 0.56 | 0.516 | 0.465 | 0.457 | 0.676 |
| Tan delta at MH | 0.016 | 0.015 | 0.017 | 0.023 | 0.021 |
| Ts2, min | 0.28 | 0.29 | 0.30 | 0.28 | 0.31 |
| Tc50, min | 0.43 | 0.42 | 0.42 | 0.40 | 0.44 |
| Tc90, min | 0.82 | 0.87 | 0.80 | 0.71 | 0.73 |
| MDSC, ° C. | | | | | |
| Glass Transition 1 | −112.1 | −111.6 | −111.2 | −111.4 | −111.5 |
| Glass Transition 2 | −126.8 | −126.5 | −126.4 | −126.2 | −126.5 |

TABLE 3-continued

| | EXAMPLE 4 | EXAMPLE 5 | EXAMPLE 6 | EXAMPLE 7 | EXAMPLE 8 |
|---|---|---|---|---|---|
| | Solvent Resistance, acetone | | | | |
| Volume Swell, % | 19 | 27 | 26 | 27 | 28 |

EXAMPLE 9

In Example 9, a curable fluoropolyether-polysiloxane composition was prepared by mixing functionalized fluoropolyether PFE-3 with compounds as indicated in Table 4 according to the *General Procedure for Sample Preparation*. The compositions were press cured at 177° C. for 7 min. The sample was tested for its curing behavior, glass transition temperature, and solvent resistance. Results are reported in Table 4 (below).

TABLE 4

| | EXAMPLE 9 |
|---|---|
| Composition | |
| PFE-3 | 100 |
| SIL-9 | 50 |
| INIT1 | 5 |
| CTS1 | 8 |
| CTS2 | 15 |
| ALPHA TECHNOLOGIES MDR at 177° C. (12 min) | |
| ML, in-lb | 0.45 |
| (cm-kg) | (0.52) |
| MH, in-lb | 15.71 |
| (cm-kg) | (18.10) |
| MH-ML, in-lb | 15.26 |
| (cm-kg) | (17.58) |
| Tan delta at ML | 0.444 |
| Tan delta at MH | 0.037 |
| Ts2, min | 0.33 |
| Tc50, min | 0.44 |
| Tc90, min | 0.82 |
| MDSC, ° C. | |
| Glass Transition | −127.3 |
| Solvent resistance, acetone | |
| Volume Swell, % | 27 |

All cited references, patents, or patent applications in the above application for letters patent, except those appearing in the Background section, are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A curable composition comprising:
  a functionalized fluoropolyether comprising:
    a random copolymer represented by the general formula $XCF_2O(CF_2O)_w(C_2F_4O)_x(C_3F_6O)_y(C_4F_8O)_zCF_2Y$ wherein w, x, y and z independently represent integers ranging from 0 to 30, with the proviso that w+x+y+z≥6; and X and Y independently represent: a free-radically polymerizable ethylenically-unsaturated group —Z—CW=CW$_2$, wherein each W independently represents H, Cl, F or CF$_3$, and Z represents a covalent bond or an alkylene group having from 1 to 10 carbon atoms and optionally substituted by at least one fluorine, chlorine, oxygen, nitrogen, sulfur, or a combination thereof, and with the proviso that at least one W is H; a halogenated alkyl group having from 1 to 10 carbon atoms and optionally substituted by at least one oxygen, nitrogen, or a combination thereof; —I; —Br; —Cl; —CN; or a cyanoalkyl group having from 2 to 11 carbon atoms and optionally substituted by at least one fluorine, oxygen, nitrogen, or a combination thereof;
  a functionalized polysiloxane comprising at least one second free-radically reactive functional group selected from the group consisting of: —I; —Br; —Cl; —CN; monovalent organic groups containing at least one —I; —Br; —Cl; —CN; and monovalent free-radically polymerizable ethylenically-unsaturated organic groups; and
  an effective amount of a free-radical curing system.

2. The curable composition of claim 1, further comprising filler.

3. The curable composition of claim 1, wherein the filler is selected from the group consisting of silicate fillers, carbon fillers, and combinations thereof.

4. The curable composition of claim 1, further comprising at least one coagent comprising at least two third functional organic groups, wherein the at least two third function organic groups are selected from the group consisting of: —I; —Br; —Cl; —CN; monovalent organic groups containing at least one —I, —Br, —Cl, —CN; and monovalent free-radically polymerizable ethylenically-unsaturated organic groups.

5. The curable composition of claim 1, wherein the at least one free-radical generating compound comprises a peroxide.

6. The curable composition of claim 1, wherein the functionalized fluoropolyether has a number average molecular weight of from 400 to 15,000 grams per mole.

7. The curable composition of claim 1, wherein the functionalized polysiloxane is represented by the formula $AQ[Si(R_1)(R_2)O]_p[Si(R_5)(R_6)O]_qSi(R_3)(R_4)QA$ wherein the organic groups —[Si(R$_5$R$_6$)O]$_q$— and —[Si(R$_1$R$_2$)O]$_p$ are placed randomly;
  each Q independently represents a covalent bond or a linking group containing from 1 to 10 carbon atoms, and is optionally substituted by at least one of sulfur, nitrogen, oxygen, or a combination thereof;
  each A independently represents a free-radically polymerizable ethylenically-unsaturated group, —CN, —I, —Br, or —Cl;
  each R$_1$, R$_2$, R$_3$, R$_4$ and R$_5$ independently represent an alkyl group or an aryl group;

each $R_6$ independently represents a side chain -QA;
p represents an integer in the range of 2 to 5000; and
q is 0 or an integer in the range of 1 to 1000.

8. The curable composition of claim 1, wherein the functionalized polysiloxane is free of Si—H bonds.

9. The curable composition of claim 1, wherein the functionalized polysiloxane is free of fluorine.

10. The curable composition of claim 1, wherein the functionalized polysiloxane has at least two terminal vinyl groups.

11. The curable composition of claim 1, wherein on a total weight basis the curable composition comprises comprising:
   10 to 90 weight percent of the functionalized fluoropolyether; and
   90 to 10 weight percent of the functionalized polysiloxane.

12. A method of making a composition comprising a fluoropolyether-polysiloxane elastomer, the method comprising:
   providing a curable composition according of claim 1; and
   free-radically curing the curable composition.

13. A shaped article obtained by injection or compression molding the curable composition of claim 1.

14. The shaped article according to claim 13, wherein the shaped article comprises at least one of a gasket, shaft seal, bearing, hose, or O-ring.

* * * * *

UNITED STATES PATENT AND TRADEMARK OFFICE
CERTIFICATE OF CORRECTION

PATENT NO.      : 9,718,961 B2
APPLICATION NO. : 14/900614
DATED           : August 1, 2017
INVENTOR(S)     : Steven Corveleyn It is certified that error appears in the above-identified patent and that said Letters Patent is hereby corrected as shown below:

Column 4
Line 5, Delete "(=O)" and insert -- (=O) --, therefor. (First Occurrence)

Column 4
Line 5, Delete "(=O)" and insert -- (=O) --, therefor. (Second Occurrence)

Column 4
Line 16, Delete "—OC)=O)" and insert -- —OC(=O) --, therefor.

Column 5
Line 2, Delete "— —CF$_2$O—" and insert -- —, —CF$_2$O—, --, therefor.

Column 7
Line 29 (Approx.), Delete "(R)" and insert -- (R$_1$) --, therefor.

Column 7
Line 40, Delete "awl" and insert -- aryl --, therefor.

Column 7
Line 41, Delete "awl" and insert -- aryl --, therefor.

Column 8
Line 57, Delete "dichorobenzoyl" and insert -- dichlorobenzoyl --, therefor.

Column 9
Lines 27-28, Delete "tetraallylinalonamide;" and insert -- tetraallylmalonamide; --, therefor.

Column 11
Line 66, Delete "to15,000" and insert -- to 15,000 --, therefor.

Signed and Sealed this
Tenth Day of April, 2018

Andrei Iancu
*Director of the United States Patent and Trademark Office*

CERTIFICATE OF CORRECTION (continued)
U.S. Pat. No. 9,718,961 B2

Column 14
Line 17 (Approx.), After "composition" delete "comprises".

Column 17-18
Line 32 (Approx.) (Table), Delete "fluoro silicone" and insert -- fluorosilicone --, therefor.

Column 17
Line 43, Delete "Corporation ," and insert -- Corporation, --, therefor.

Column 19
Line 24 (Approx.), Delete "min" and insert -- min. --, therefor.

Column 20
Line 34 (Approx.), Delete "min" and insert -- min. --, therefor.

Column 23
Line 12, In Claim 11, after "comprises" delete "comprising".